Aug. 22, 1967  K. W. JOHNSON  3,337,167
VIBRATION ISOLATOR
Filed July 11, 1966  3 Sheets-Sheet 1
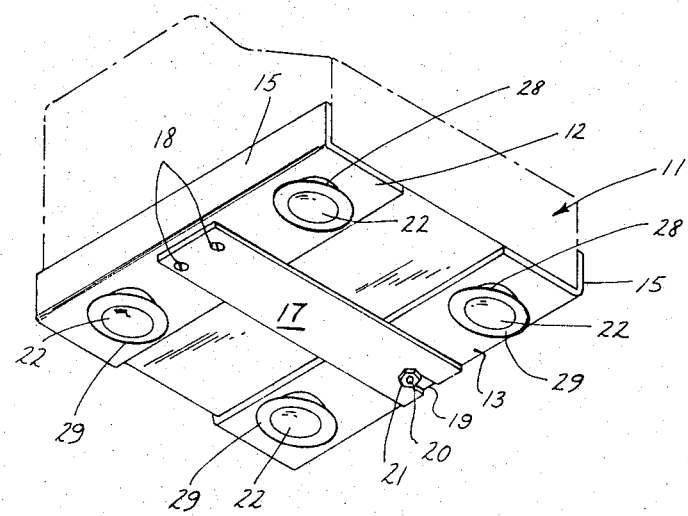
Fig. 1
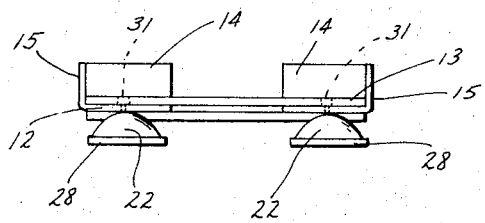
Fig. 2
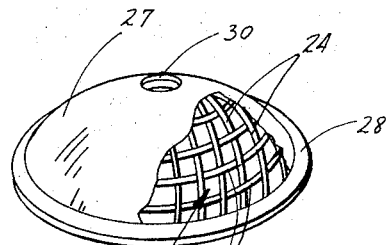
Fig. 3
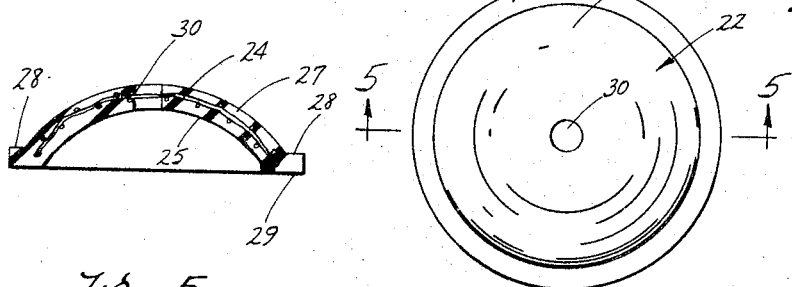
Fig. 5
Fig. 4
INVENTOR.
KENNETH W. JOHNSON
BY
ATTORNEYS Aug. 22, 1967   K. W. JOHNSON   3,337,167
VIBRATION ISOLATOR Filed July 11, 1966   3 Sheets-Sheet 2

INVENTOR.
KENNETH W. JOHNSON
BY
ATTORNEYS

Aug. 22, 1967  K. W. JOHNSON  3,337,167
VIBRATION ISOLATOR
Filed July 11, 1966  3 Sheets-Sheet 3

INVENTOR.
KENNETH W. JOHNSON
BY
ATTORNEYS

United States Patent Office 3,337,167
Patented Aug. 22, 1967

3,337,167
VIBRATION ISOLATOR
Kenneth W. Johnson, 4113 N. Lakeshore Drive, Rte. 1,
Jamestown, Ohio 45335
Filed July 11, 1966, Ser. No. 564,351
3 Claims. (Cl. 248—24)

The present invention relates to a vibration isolating and friction gripping device for business machines, test equipment, electronic equipment, industrial machines and the like and constitutes a continuation-in-part of co-pending application Ser. No. 402,587, filed Oct. 8, 1964, for Vibration Isolator, now U.S. Patent 3,288,405 issued Nov. 29, 1966, which, in turn, was a continuation-in-part of prior application Ser. No. 177,037, filed Mar. 2, 1962, for a Vibration Isolator and Gripping Device, now abandoned.

A primary object of the invention is to provide novel dome-shaped resilient elements which when properly attached to a particular device or machine provide correct spring strengths or rates at a loading point whereby the vibration of the particular machine or device is either absorbed by or dissipated in the resilient element of this invention, thus reducing the transmission of vibration. In addition, the resilient elements of this invention, when subjected to varying load conditions, provide tenacious friction engagement with a supporting surface which restricts creeping or sliding of the supported equipment.

A further object of the invention is to provide a unit comprising a pair of mounting trays or a frame of adjustable width in accordance with the size of the base of the particular machine or device to be supported as, for example, a typewriter, a telephone or the like by a plurality of dome-shaped vibration isolators in accordance with the instant invention fixed at their apices to the bottom of the frame.

Another object of the invention is to provide a device of the character set forth in which means are provided to restrict movement of the device relative to a surface upon which it is disposed and also to restrict movement relative to the device of a business machine or the like supported thereon.

A further object of the invention is to provide a device of the character set forth which is fully self-contained.

Another object of the invention is to provide a device of the character described which will fit machines of different sizes, weights and vibration factors, through width adjustability and by the use of differently rated springs.

A further object of this invention is to provide devices of the character described which may be fitted directly to certain machines and equipment to provide a synergistic vibration-absorbent frictionally-engaging action whereby such machines and equipment cause the devices under load to expand and thus exert increasing frictional engagement as the spring component of the devices spreads under increased loading.

Other objects of the invention are: to reduce vibration transmitted to support structures; to reduce noise; to match the spring strengths to the loadings at the support points (conventional rubber and felt pads have constant initial spring ratings over their entire areas); to add to the appearance of the machines and devices of the type set forth above as well as to an office; to provide "floating" mounting for such machines and devices; and to provide long life (as compared with compressible rubber, conventional spring or felt pads).

Other objects of the invention will become apparent from a reading of the following description taken in conjunction with the drawings; in which:

FIGURE 1 is a perspective view of the under surface of a preferred embodiment of the invention, shown in conjunction with a frame type support;

FIGURE 2 is a front elevational view of the support of FIGURE 1;

FIGURE 3 is a perspective view partially broken away of one of the dome-shaped elements of the instant invention;

FIGURE 4 is an enlarged top plan view of one resilient element of FIGURE 3;

FIGURE 5 is a sectional view taken substantially along line 5—5 of FIGURE 4, as viewed in the direction indicated by the arrows;

Similar reference characters refer to similar parts throughout the several views of the drawings.

Figure 6:
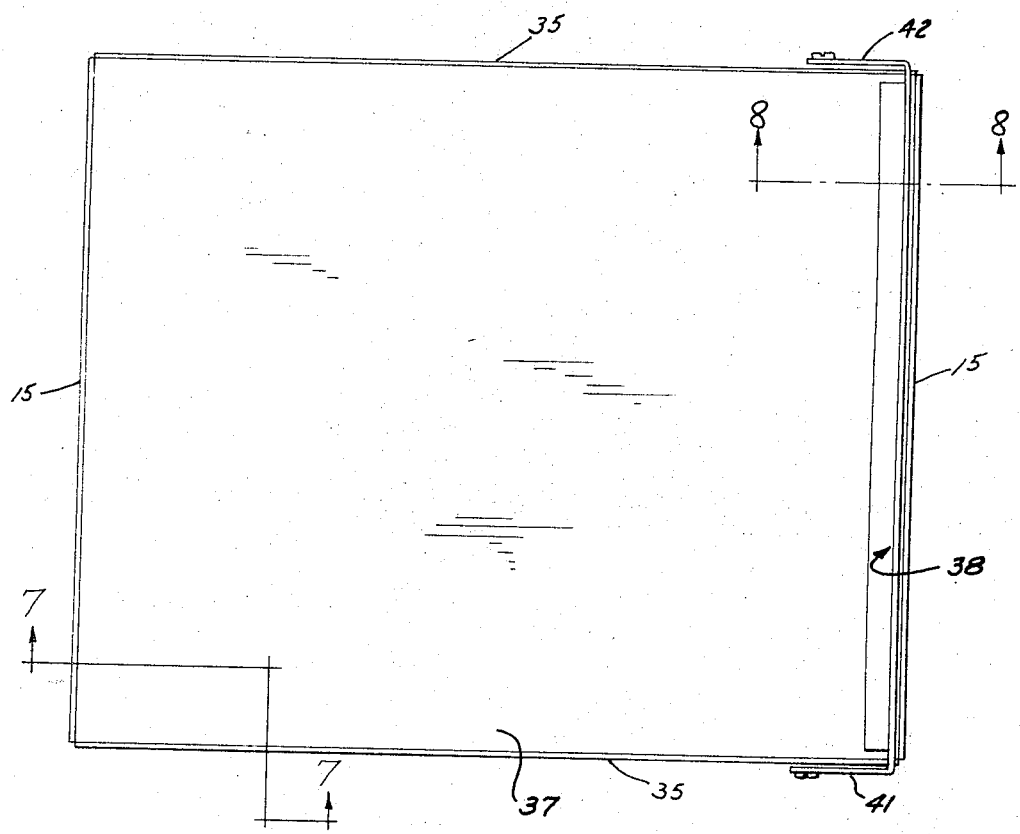
FIGURE 6 is a top plan view illustrating a modification of the embodiment of FIGURE 1.

Referring to FIGURES 1 and 2, this invention will be described as a component of a width adjustable frame type support generally designated by numeral 11. Support 11 comprises a pair of angle bar sections 12 and 13 and the rear ends of these sections are bent upwardly to form retaining flanges 14 of the same height as side flanges 15.

Support 11 is made width adjustable to hold machines such as, for example, typewriters of different sizes, by a rigid metal strap 17 riveted at 18 to the bottom surface of angle bar 12 medially thereof and extending at right angles therefrom to underlie the central portion of the other angle bar 13. Strap 17 has a central longitudinal slot 19 in its free end for width adjustably receiving therein the shank of a screw 20. Screw 20 cooperates with nut 21 to clamp strap 17 rigidly to the bottom surface of angle bar 15 to hold parts 12 and 13 in desired adjusted parallel spacing.

Each of angle bars 12 and 13 is provided with front and rear resilient feet 22 constructed in accordance with the instant invention. It is preferred, but not necessary, that all of the feet 22 should be of the same size, shape and appearance. However, for supporting machines in which the loading on the several feet will vary considerably, it is desirable to employ the feet of this invention in which the dome-shaped portions are of selected strengths to compensate for the variation in the loading thereon.

As is best illustrated in FIGURES 3–5, each dome-shaped member or portion of foot 22 is a composite of a plurality of individual members or elements 24, 25 connected together to provide a unitary member which functions in a spring-like manner. Elements 24 and 25 are formed of a yieldable metal material and preferably are formed of wire screen-like material or of woven metal cloth with the individual elements 24, 25 of concavo-convex shape and angularly disposed relative to one another so that each such individual element constitutes in itself a spring, and because of the interweaving of such elements, each dome-shaped member 26 constitutes a plurality of springs in itself. Member 26 and its elements 24, 25 are molded and encased within a casing 27 of rubber or rubber-like material having resiliency characteristics so that the composite of dome-shape member 26 and casing 27 likewise constitute a plurality of interconnected spring-like members.

In an ordinary spring, made of metal wire, the spring rate or gradient is a function of the diameter of the spring wiring. Similarly, the spring rate or gradient of a rubber spring-like member is a function of the relative hardness or softness of the material. In accordance with the present invention, the co-action of elements 24, 25 and the material of casing 27 provided in foot 22 is such that foot 22 constitutes a composite spring, the spring rate or gradient of which is a function of the diameter or diameters of elements 24, 25, the hardness of the material of casing 27, and additionally is varied and/or modified because of the presence of casing material encompassed within the quadrilateral structure formed by adjacent pairs of interwoven elements 24, 25, which material must be compressed in one direction and elongated in a perpendicular direction in order to deflate the composite spring. As a vibration isolator, the structure of composite foot 22 also modifies the friction damping characteristics of interwoven elements 24, 25. The presence of the casing material encompassed within the quadrilateral structure provides a very substantially increased damping characteristic as compared to the relatively little amount of damping obtainable from the mere interweaving of elements 24, 25.

An integral annular flange 28 having a flat bottom surface 29 surrounds the bottom of the dome-shaped member and provides a frictional gripping surface, the grip of which is increased in accordance with an increase of pressure on the top of its associated dome-shaped member. A central opening 30 at the apex of the member extending through covering 27 and spring member 26 accommodates a rivet 31 for securing the device to the associated frame member 12 or 13.

Figure 7:
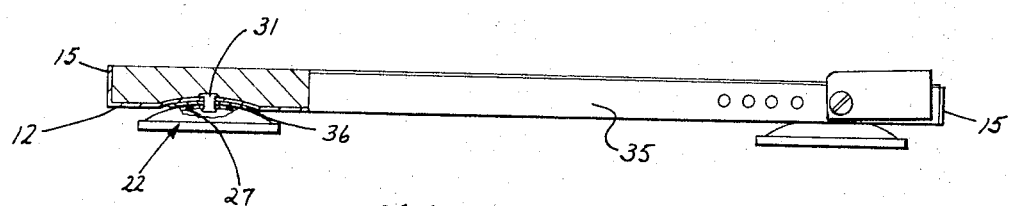
FIGURE 7 is an elevational view partly in section taken along line 7—7 of the device of FIGURE 6.
Figure 9:
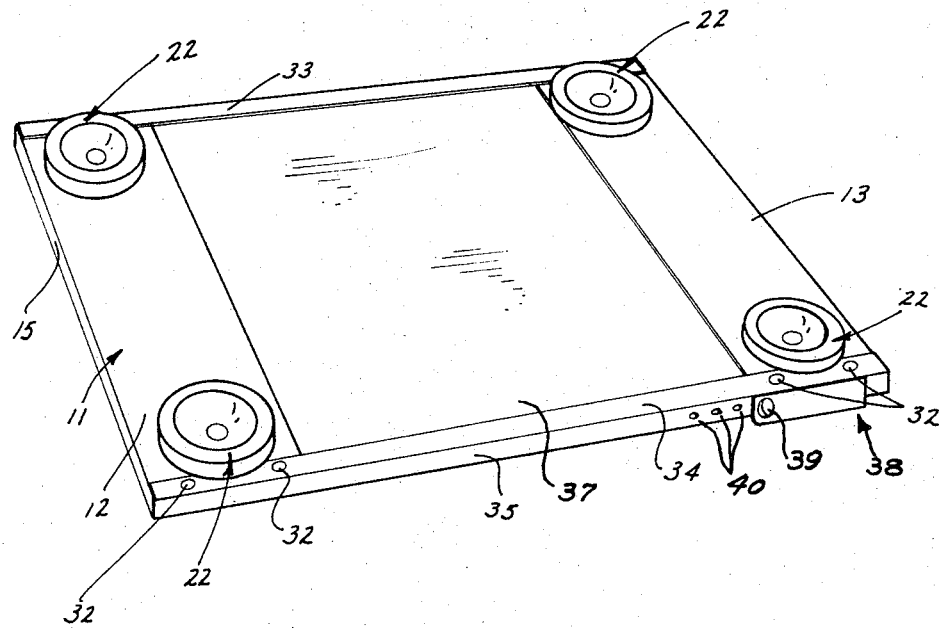
FIGURE 9 is a perspective view of the under surface of the device of FIGURE 6.
Figure 8:
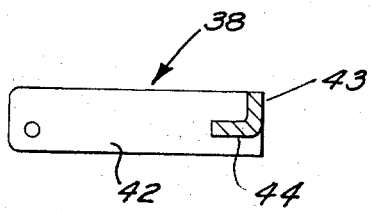
FIGURE 8 is a partial sectional view taken along line 8—8 of FIGURE 6.

In the modified embodiment shown in FIGURES 6-9 inclusive, support 11 is in the form of a tray or tray-like structure comprising a pair of angle sections 12, 13 having side flanges 15 suitably connected, as by rivets 32 or by welding or other known manner, to another pair of angle sections 33, 34 having side flanges 35. Each of the angle sections 12, 13 is provided with front and rear vibration isolating support feet 22, each comprising a dome-shaped resilient element 26 completely encased in a rubber casing or covering 27. As noted heretofore, a central opening 30 is provided at the apex of the dome-shaped resilient member 26 and extends through the casing or covering 27 to accommodate a rivet 31 for securing each of feet 22 to its associated section member 12 or 13 with a washer 36 interposed therebetween.

A member 37 provides a table-like support for a business machine and is received in and supported by the tray formed by angle bar sections 12, 13 and sections 33, 34. In addition to providing a table-like support for a business machine, in accordance with the invention, support member 37 is made of a sound-absorbing material such as acoustical tile and thus performs the dual function of a support member as well as a sound-absorber.

In accordance with the invention, means are provided for adjustably positioning a business machine on the support frame in a manner to prevent movement of the business machine on the top surface of the support to prevent a tendency of the machine to gradually creep off the support which is particularly troublesome in the case of machines having a reciprocable carriage such as a typewriter. This is achieved in accordance with the invention by the provision of a positioning member 38 generally U-shaped in configuration with the free end thereof pivotally connected to the sides of sections 33, 34 by a screw or bolt 39. In order to provide adjustability to accommodate different sizes and kinds of business machines, bolt 39 may be selectively received in one of several openings 40 provided in flange portion 35 of members 33, 34. Positioning member 38 comprises legs 41, 42 which are respectively pivotally mounted on opposite sides of the support frame as noted above. Legs 41, 42 are connected by a laterally extending portion comprising an upstanding portion 43 and a relatively horizontal portion 44, the lower surface of which rests upon support member 37. When a business machine is positioned on support member 37, portions of legs 41, 42 extend above the upper surface of support member 37 and thus provide lateral restraint against lateral movement of the business machine. Similarly, upstanding portion 43 provides a restraint guarding against the business machine being moved accidentally or otherwise off the edge of the support member 37.

Thus it will be apparent that the vibration isolators according to the present invention have relatively unlimited adaptability with respect to all types of machines and equipment which require vibration-absorbing frictionally engaging action for most effective use. Moreover, such machines and equipment which utilize the vibration isolators of the present invention, cause such devices under loading conditions to exert a tenacious frictional engagement by reason of the fact that the spring component of the device spreads under increasing loading conditions. Positive gripping is insured because as the spring is loaded with increasing loads, the tighter the frictional gripping becomes. Additionally, the vibration isolators of the present invention differ from sponge rubber or felt pads which tend to become depressed at their mounting points and lose their effectiveness whereas the metal springs of the present invention retain their resiliency almost indefinitely.

While particular embodiments have been illustrated and described, it will be obvious to those skilled in the art that various changes and modifications may be made without departing from the invention, and it is intended in the appended claims to cover all such changes and modifications that fall within the true spirit and scope of the invention.

What is claimed is:

1. A vibration isolator device for synergistically combining vibration-absorption action with frictional-engaging action while supporting an object comprising a plurality of composite spring members each including a plurality of interwoven and spaced apart resilient elements forming a dome-shaped element, each composite spring member being encased within a resilient casing member and forming therewith a unitary structure having substantially continuous flat surface portion for frictionally engaging a support surface, means including an opening in each casing member for connecting said unitary structure to a support for an object to be supported, said connecting means including a connecting member disposed within said opening and connected to said unitary structure, said support comprising a frame member connected to said connecting members and a pad member of sound-absorbing material carried by said frame member for supporting a business machine or the like.

2. Structure according to claim 1 and additionally including a transverse member adjustably connected to said frame member for positioning and maintaining the position of a machine to be supported on said support member.

3. Structure according to claim 2 wherein said transverse member is U-shaped with the extremities thereof pivotally connected to opposite sides of said frame member.

References Cited
UNITED STATES PATENTS

| 1,420,082 | 6/1922 | Dowd | 248—24 X |
| 2,607,590 | 8/1952 | Wheaton | 248—188.8 X |
| 2,670,914 | 3/1954 | Jones | 248—24 |
| 2,778,629 | 1/1957 | Johnson | 267—1 |

ROY D. FRAZIER, *Primary Examiner.*

JOHN PETO, *Examiner.*